United States Patent
Pachciarz et al.

(10) Patent No.: US 6,761,380 B2
(45) Date of Patent: Jul. 13, 2004

(54) FILLER NECK ASSEMBLY FOR FUEL TANK

(75) Inventors: Mahlon R. Pachciarz, Grand Blanc, MI (US); Edward A. Beutler, Flushing, MI (US)

(73) Assignee: Delphi Technologies, Inc., Troy, MI (US)

( * ) Notice: Subject to any disclaimer, the term of this patent is extended or adjusted under 35 U.S.C. 154(b) by 37 days.

(21) Appl. No.: 10/140,046

(22) Filed: May 7, 2002

(65) Prior Publication Data

US 2003/0209905 A1 Nov. 13, 2003

(51) Int. Cl.⁷ ............................................. F16L 41/00
(52) U.S. Cl. .................... 285/204; 285/222; 285/382.4; 277/644
(58) Field of Search ................................ 277/606, 910, 277/608, 614, 626, 644; 220/86.2, 601, 614; 285/189, 192, 204, 205, 222, 338, 382, 382.4, 382.5, 202, 139.1, 141.1, 139.3, 139.2

(56) References Cited

U.S. PATENT DOCUMENTS

| | | | | |
|---|---|---|---|---|
| 1,030,306 A | * | 6/1912 | Hull | 285/139.2 |
| 4,460,104 A | * | 7/1984 | Kitsukawa | 220/304 |
| 4,952,347 A | * | 8/1990 | Kasugai | 264/457 |
| 5,253,773 A | * | 10/1993 | Choma et al. | 220/86.2 |
| 5,390,808 A | * | 2/1995 | Choma et al. | 220/86.2 |
| 5,466,016 A | | 11/1995 | Briody et al. | |
| 5,474,235 A | * | 12/1995 | Cole et al. | 239/431 |
| 5,581,862 A | * | 12/1996 | Choma et al. | 29/33 K |
| 5,665,921 A | * | 9/1997 | Gerst et al. | 73/715 |
| 5,971,444 A | * | 10/1999 | Hawkins | 285/139.2 |
| 6,129,361 A | * | 10/2000 | Dover | 277/608 |
| 6,138,859 A | | 10/2000 | Aulph et al. | |
| 6,260,578 B1 | | 7/2001 | Kuehnemund et al. | |
| 6,293,419 B1 | | 9/2001 | Farrar | |
| 6,305,568 B1 | * | 10/2001 | Suzuki et al. | 220/562 |
| 6,357,617 B1 | * | 3/2002 | Kido | 220/86.2 |
| 6,367,650 B1 | | 4/2002 | Kuehnemund et al. | |
| 6,405,753 B1 | | 6/2002 | Beyer et al. | |
| 6,561,522 B1 | * | 5/2003 | Radelet et al. | 277/626 |

FOREIGN PATENT DOCUMENTS

| | | | | |
|---|---|---|---|---|
| GB | 156038 | * | 1/1921 | 285/202 |
| GB | 763857 | * | 12/1956 | 285/202 |

* cited by examiner

Primary Examiner—Lynne H. Browne
Assistant Examiner—Aaron Dunwoody
(74) Attorney, Agent, or Firm—Jimmy L. Funke

(57) ABSTRACT

A filler neck assembly includes a plastic fuel tank having a wall with an opening extending therethrough. The filler neck assembly also includes a filler neck tube extending through the opening in the fuel tank and having an annular stop flange projecting radially outward from the filler neck tube outside the wall and an annular lock flange projecting radially outward from the filler neck tube formed inside the wall to lock the filler neck tube to the fuel tank. The stop flange and the lock flange provide the sole means for securing the filler neck tube within the opening. The filler neck assembly further includes a seal interposed in the opening between the wall and the filler neck tube and a washer disposed inside the fuel tank between the wall and the lock flange to engage the seal.

23 Claims, 2 Drawing Sheets

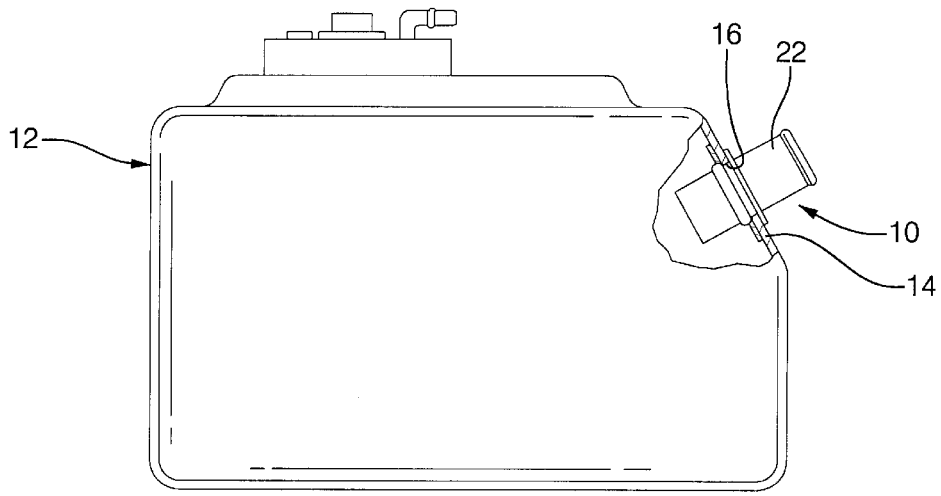
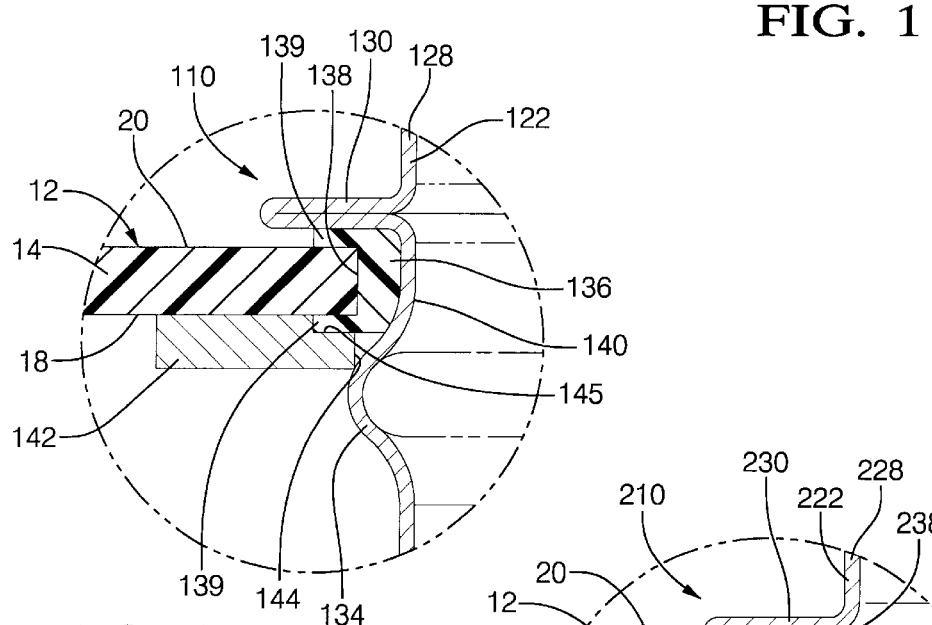
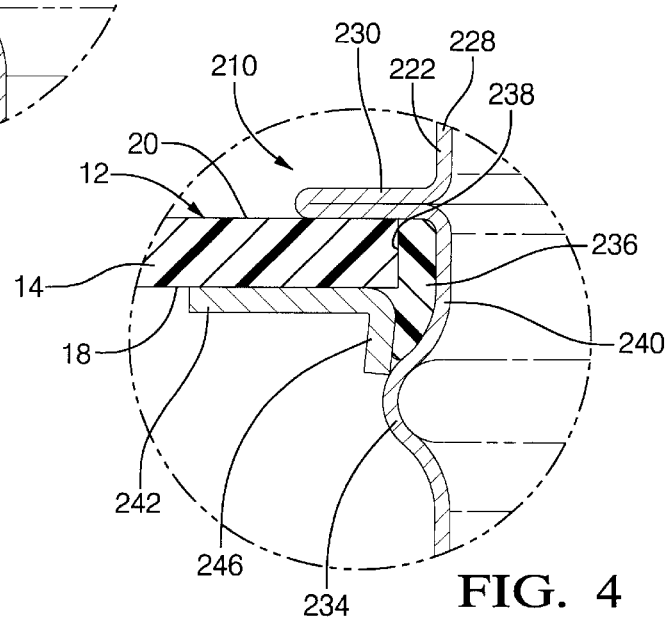
FIG. 1
FIG. 3
FIG. 4

FILLER NECK ASSEMBLY FOR FUEL TANK

TECHNICAL FIELD

The present invention relates generally to fuel tanks for vehicles and, more particularly, to a filler neck assembly for a fuel tank of a vehicle.

BACKGROUND OF THE INVENTION

It is known to provide a fuel tank such as a metal fuel tank in a vehicle to hold fuel to be used by an engine of the vehicle. In some vehicles, a tank filler neck tube or filler pipe extension extends between a cap and the metal fuel tank. It is also known to provide a solderless filler neck joint for a metal fuel tank. An example of such a solderless filler neck joint is disclosed in U.S. Pat. No. 5,466,016 to Briody et al. In this patent, a solderless fuel tank filler neck joint includes a resilient seal interposed between a flanged opening in the fuel tank and the filler neck tube. The seal is compressed between the filler neck tube and the flange by mechanical deformation of the filler neck tube after it is inserted through the flanged opening. Mechanical deformation pulls the seal into a mating pocket surrounding the flanged opening compressing an annular bead formed on the seal, thereby providing a resilient secure leak tight joint. This process has been extremely reliable and robust relative to potential leaks.

It is known to provide a plastic fuel tank in a vehicle to hold fuel to be used by an engine of the vehicle. Currently in plastic fuel tanks, the tank filler neck tube or fill pipe extension is attached to the plastic fuel tank using a face welding such as hot plate welding, spin welding, etc. Welding of the filler neck tube to the plastic tank requires the use of like materials such as high density polyethylene, which also allows a break in a barrier material such as EVOH inside a tank wall material used to reduce permeation of hydrocarbons, thus making it difficult to meet federal emissions requirements. In addition, the plastic walls of the filler neck tube are not always robust enough when a hose and clamp assembly is used to make a connection to another component of the vehicle. Typically, this type of weld is prone to leaking over time due to stress and fatigue from shear and cantilever loading due to the weld being under a shear force.

Therefore, it is desirable to provide a new filler neck assembly for a plastic fuel tank in a vehicle that is more robust. It is also desirable to provide a filler neck assembly for a plastic fuel tank in a vehicle that eliminates a tank to filler neck tube weld zone. It is further desirable to provide a filler neck assembly for a plastic fuel tank in a vehicle that incorporates a tank filler neck tube.

SUMMARY OF THE INVENTION

It is, therefore, one object of the present invention to provide a filler neck assembly for a plastic fuel tank in a vehicle.

It is another object of the present invention to provide a filler neck assembly for a plastic fuel tank in a vehicle that eliminates a tank to filler neck tube weld zone.

To achieve the foregoing objects, the present invention is a filler neck assembly including a plastic fuel tank having a wall with an opening extending therethrough. The filler neck assembly also includes a filler neck tube extending through the opening and having an annular stop flange projecting radially outward from the filler neck tube outside the wall and an annular lock flange projecting radially outward from the filler neck tube formed inside the wall to lock the filler neck tube to the fuel tank. The stop flange and the lock flange provide the sole means for securing the filler neck tube within the opening. The filler neck assembly further includes a seal interposed in the opening between the wall and the filler neck tube and a washer disposed inside the fuel tank between the wall and the lock flange to engage the seal.

One advantage of the present invention is that a new filler neck assembly is provided for a plastic fuel tank in a vehicle. Another advantage of the present invention is that the filler neck assembly eliminates a tank to filler neck tube weld zone. Yet another advantage of the present invention is that the filler neck assembly is simpler and more robust and is not prone to field leakage over time. Still another advantage of the present invention is that the filler neck assembly is lower in cost, has improved quality and does not require high tech equipment for assembly.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 1 is a fragmentary elevational view of a filler neck assembly, according to the present invention, illustrated in operational relationship with a plastic fuel tank.

FIG. 3 is an enlarged fragmentary elevational view of another embodiment, according to the present invention, of the filler neck assembly of FIG. 1.

FIG. 4 is an enlarged fragmentary elevational view of yet another embodiment, according to the present invention, of the filler neck assembly of FIG. 1.

DESCRIPTION OF THE PREFERRED EMBODIMENT

Figure 2:
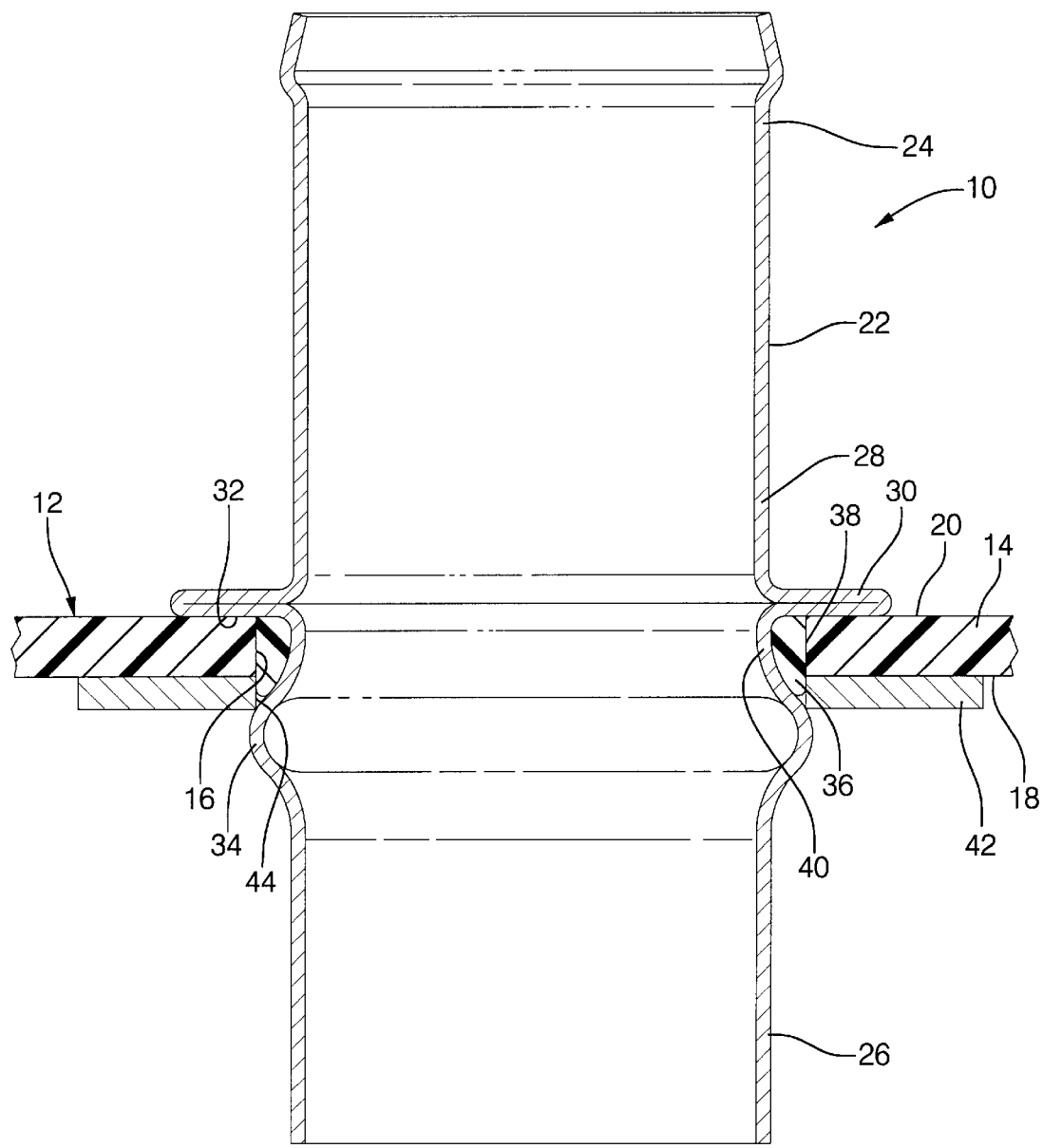
FIG. 2 is an enlarged fragmentary elevational view of the filler neck assembly of FIG. 1.

Referring to the drawings and in particular FIGS. 1 and 2, one embodiment of a filler neck assembly 10, according to the present invention, is shown for a plastic fuel tank, generally indicated at 12, of a vehicle (not shown). The fuel tank 12 includes a wall 14 having an opening 16 extending therethrough for receiving a portion of the filler neck assembly 10. The wall 14 has an interior surface 18 and an exterior surface 20. The opening 16 is generally circular in shape. The fuel tank 12 is formed of a plastic material such as laminated polyethylene with an embedded vapor barrier film. The fuel tank 12 is formed by either a twin sheet vacuum thermo-forming or blow-molding process. It should be appreciated that, except for the filler neck assembly 10, the fuel tank 12 is conventional and known in the art.

The filler neck assembly 10 includes a tank filler neck tube 22 extending through the opening 16 in the wall 14 of the fuel tank 12. The tank filler neck tube 22 is a generally cylindrical tube or pipe having a generally circular cross-sectional shape. The tank filler neck tube 22 has an upper end 24 for connection to a fuel filler pipe (not shown) mounted in a vehicle body (not shown) of the vehicle. The upper end 24 is disposed above the exterior surface 20 of the wall 14 of the fuel tank 12. The tank filler neck tube 22 also has a lower end 26 disposed below the interior surface 18 of the wall 14 of the fuel tank 12. The tank filler neck tube 22 has a base portion 28 extending between the upper end 24 and the lower end 26. The tank filler neck tube 22 includes an annular stop bead or flange 30 extending radially outwardly from the base portion 28 that acts as a stop at the exterior surface 20 of the wall 14 when the tank filler neck tube 22 is inserted into the opening 16. The stop bead 30 exhibits a surface 32 parallel to the tank wall 14. The tank filler neck tube 22 includes an annular lock bead or flange 34 extending radially outwardly from the base portion 28 of the tank filler neck tube 22. The lock flange 34 is continuously formed annular by mechanical deformation. The tank filler neck tube 22 is made of a metal material such as steel. It should be appreciated that the tank filler neck tube 22 is a monolithic structure being integral, unitary, and one-piece. It should also be appreciated that the stop flange 30 has a diameter greater than a diameter of the lock flange 34 and extends over the wall 14 farther than the lock flange 34 to allow for greater surface area of holding the fuel tank 12.

The filler neck assembly 10 includes a seal 36 disposed within the opening 16 of the wall 14 of the fuel tank 12 and circumferentially about the tank filler neck tube 22. The seal 36 is in the shape of an annular ring and engages the opening 16 and filler neck tube 22. The seal 36 has a planar outer surface 38 engaging the planar edges of the wall 14 of the fuel tank 12 and extends downwardly past the wall 14 into the fuel tank 12. The seal 36 also has an arcuate shaped inner surface 40 engaging the arcuate shaped surface of the base portion 28 of the tank filler neck tube 22 between the flanges 30 and 34. The seal 36 is made of a resilient material such as Viton. It should be appreciated that the tank filler neck tube 22 extends through the seal 36.

The filler neck assembly 10 further includes a ring or washer 42 disposed inside of the fuel tank 12 and cooperating with the seal 36. The washer 42 is of a ring type being generally planar and circular in shape and has an aperture 44 extending axially therethrough of a diameter similar to the opening 16 in the wall 14. The washer 42 is made of a metal material such as steel. The washer 42 is attached to the interior surface 18 of the fuel tank 12 by suitable means such as an adhesive. It should be appreciated that the outer surface 38 of the seal 36 engages the planar edge of the aperture 44 of the washer 42. It should also be appreciated that an upset force of the tank filler neck tube 22 directed to the washer 42 and its larger surface area assures trapping the seal 36 and fuel tank 12 into position.

The lock flange 34 is formed continuously around the perimeter of the tank filler neck tube 22 using a bead-lock tooling after the tank filler neck tube 22 is inserted through the opening 16 and the seal 36. The formation of the lock flange 34 pulls material from a surrounding area of the tank filler neck tube 22. This in turn results in an application of a sealing force between the tank filler neck tube 22 and the lock flange 34 against the seal 36. The formation of the lock flange 34 in the wall of the tank filler neck tube 22 is sufficient, when cooperating with the stop flange 30 and the flange 34 to lock the tank filler neck tube 22 in position relative to the fuel tank 12.

Assembly of the joint may be performed before or after construction of the fuel tank 12 is completed. When constructing the fuel tank 12, the opening 16 is formed in the wall 14 of the fuel tank 12 and the washer 42 is attached to the interior surface 18. The tank filler neck tube 22 is constructed with the stop flange 30. The annular seal 36 is positioned around the opening 16. The tank filler neck tube 22 is inserted through the seal 36 and the opening 16 up to the stop flange 30. The bead lock tooling is then positioned in the tank filler neck tube 22 and the lock flange 34 is easily formed continuously around the perimeter of the tank filler neck tube 22. Referring to FIG. 3, another embodiment, according to the present invention, of the filler neck assembly 10 is shown. Like parts of the filler neck assembly 10 have like reference numerals increased by one hundred (100). In this embodiment, the filler neck assembly 110 includes the seal 136 being trapped on both sides of the fuel tank 112. The seal 136 has a general "C" shape. The seal 136 has a planar outer surface 138 engaging the planar edge of the wall 14 of the fuel tank 12. The seal 136 also has at least one, preferably a pair, flange 139 extending radially from the outer surface 138 and overlapping the wall 14 on both the exterior surface 20 and the interior surface 18. The seal 136 also has an arcuate shaped inner surface 140 engaging the arcuate shaped surface of the base portion 128 of the tank filler neck tube 122 between the flanges 130 and 134. The filler neck assembly 110 includes the washer 142 having the aperture 144 extending axially therethrough. The washer 142 has a recess 145 extending radially therein on a top surface thereof to receive the bottom flange 139 of the seal 136. It should be appreciated that the top flange 139 of the seal 136 is sandwiched between the flange 130 and the exterior surface 20 of the wall 14 and the bottom flange 139 is sandwiched between the washer 142 and the interior surface 18 of the wall 14. It should also be appreciated that the seal 136 provides an excellent seal for leak and direct contact of a low permeable material to the barrier material, ethylene vinyl alcohol (EVOH), of the fuel tank 12 combined with the steel walls of the tank filler neck tube 122. It should further be appreciated that the filler neck assembly 110 provides a low permeation attachment level to plastic fuel tanks.

Referring to FIG. 4, yet another embodiment, according to the present invention, of the filler neck assembly 10 is shown. Like parts of the filler neck assembly 10 have like reference numerals increased by two hundred (200). In this embodiment, the filler neck assembly 210 includes the seal 236 disposed within the opening 16 of the wall 14 of the fuel tank 12 and about the tank filler neck tube 222. The seal 236 has a planar outer surface 238 engaging the planar edge of the wall 14 of the fuel tank 12 and extends downwardly past the wall 14 into the fuel tank 12. The seal 236 also has an arcuate shaped inner surface 240 engaging the arcuate shaped surface of the base portion 228 of the tank filler neck tube 222 between the flanges 230 and 234. The filler neck assembly 210 also includes the washer 242 disposed inside of the fuel tank 12. The washer 242 has a flange 246 extending generally perpendicular thereto to engage the downwardly extending portion of the seal 236 that acts like a spring to provide a spring force to the seal 236. The upset of the tank filler neck tube 222 provides side forces on the flange 246 and takes up any variation in the fuel tank 12 that may occur over time due to effects from the environment or fuels. It should be appreciated that, with the tank filler neck tube 222 made of steel, this could reduce/eliminate the problem that some plastic fill pipe extensions have for maintaining the shape of the barrel diameter when a rubber hose pipe and clamp are attached. It should also be appreciated that the filler neck assembly 210 can be applied to various components requiring a hole being placed inside of the plastic fuel tank 12.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A filler neck assembly comprising:
a plastic fuel tank having a wall with an opening extending therethrough;
a filler neck tube, being a monolithic structure, extending through said opening having an annular stop bead projecting radially outward from said filler neck tube outside the wall and a continuously formed, annular lock bead projecting radially outward from said filler neck tube formed inside said wall to lock said filler neck tube to said fuel tank, said stop bead and said lock flange bead providing the sole means for securing said filler neck tube within said opening;
a seal interposed in said opening radially between said wall and said filler neck tube; and
a washer disposed inside said fuel tank axially between said wall and said lock flange to engage said seal.

2. A filler neck assembly as set forth in claim 1 wherein said seal is annular in shape and has an inner surface with an arcuate shape and an outer surface with a planar shape.

3. A filler neck assembly as set forth in claim 2 wherein said seal has flanges extending radially and overlapping said wall on an interior surface and an exterior surface of said wall.

4. A filler neck assembly as set forth in claim 1 wherein said washer has an aperture extending axially therethrough to allow said filler neck tube to extend through said washer.

5. A filler neck assembly comprising:
a plastic fuel tank having a wall with an opening extending therethrough;
a filler neck tube extending through said opening and having an annular stop flange projecting radially outward from said filler neck tube outside said wall and an annular lock flange projecting radially outward from said filler neck tube formed inside said wall to lock said filler neck tube to said fuel tank, said stop flange and said lock flange providing the sole means for securing said filler neck tube within said opening;
a seal interposed in said opening between said wall and said filler neck tube;
a washer disposed inside said fuel tank between said wall and said lock flange to engage said seal;
wherein said seal is annular in shape and has an inner surface with an arcuate shape and an outer surface with a planar shape and flanges extending radially and overlapping said wall on an interior surface and an exterior surface of said wall; and
wherein said washer has a recess extending therefrom to receive one of said flanges of said seal.

6. A filler neck assembly comprising:
a plastic fuel tank having a wall with an opening extending therethrough;
a filler neck tube extending through said opening and having an annular stop flange projecting radially outward from said filler neck tube outside said wall and an annular lock flange projecting radially outward from said filler neck tube formed inside said wall to lock said filler neck tube to said fuel tank, said stop flange and said lock flange providing the sole means for securing said filler neck tube within said opening;
a seal interposed in said opening between said wall and said filler neck tube;
a washer disposed inside said fuel tank between said wall and said lock flange to engage said seal; and
wherein said washer has a flange extending therefrom to engage said seal to provide a spring force to said seal.

7. A filler neck assembly as set forth in claim 1 wherein said seal is made of a resilient material.

8. A filler neck assembly as set forth in claim 7 wherein said resilient material comprises Viton.

9. A filler neck assembly as set forth in claim 1 wherein said filler neck tube is made of a metal material.

10. A filler neck assembly as set forth in claim 9 wherein said metal material comprises steel.

11. A filler neck assembly as set forth in claim 1 wherein said washer is made of a metal material.

12. A filler neck assembly as set forth in claim 11 wherein said metal material comprises steel.

13. A filler neck assembly for a fuel tank comprising:
a plastic fuel tank having a wall with an opening extending therethrough;
a filler neck tube, being a monolithic structure, extending through said opening in said fuel tank and having an annular stop bead projecting radially outward from said filler neck tube outside the wall and a continuously formed, annular lock bead projecting radially outward from said filler neck tube formed inside said wall to lock said filler neck tube to said fuel tank, said stop bead and said lock bead providing the sole means for securing said filler neck tube within said opening;
a seal interposed in said opening radially between said wall and said filler neck tube, said seal being annular in shape and having an inner surface with an arcuate shape and an outer surface with a planar shape; and
a washer disposed inside said fuel tank axially between said wall and said lock flange to engage said seal, said washer having an aperture extending axially therethrough to allow said filler neck tube to extend through said washer.

14. A filler neck assembly as set forth in claim 13 wherein said seal is made of a resilient material.

15. A filler neck assembly as set forth in claim 14 wherein said resilient material comprises Viton.

16. A filler neck assembly as set forth in claim 13 wherein said filler neck tube is made of a metal material.

17. A filler neck assembly as set forth in claim 16 wherein said metal material comprises steel.

18. A filler neck assembly as set forth in claim 13 wherein said washer is made of a metal material.

19. A filler neck assembly as set forth in claim 18 wherein said metal material comprises steel.

20. A filler neck assembly as set forth in claim 13 wherein said seal has flanges extending radially and overlapping said wall on an interior surface and an exterior surface of said wall.

21. A filler neck assembly comprising:
a plastic fuel tank having a wall with an opening extending therethrough;
a filler neck tube extending through said opening in said fuel tank and having an annular stop flange projecting radially outward from said filler neck tube outside said wall and an annular lock flange projecting radially outward from said filler neck tube formed inside said wall to lock said filler neck tube to said fuel tank, said stop flange and said lock flange providing the sole means for securing said filler neck tube within said opening;
a seal interposed in said opening between said wall and said filler neck tube, said seal being annular in shape and having an inner surface with an arcuate shape and an outer surface with a planar shape;
a washer disposed inside said fuel tank between said wall and said lock flange to engage said seal, said washer having an aperture extending axially therethrough to allow said filler neck tube to extend through said washer;

wherein said seal has flanges extending radially and overlapping said wall on an interior surface and an exterior surface of said wall; and wherein said washer has a recess extending therefrom to receive one of said flanges of said seal.

22. A filler neck assembly comprising:

a plastic fuel tank having a wall with an opening extending therethrough;

a filler neck tube extending through said opening in said fuel tank and having an annular stop flange projecting radially outward from said filler neck tube outside said wall and an annular lock flange projecting radially outward from said filler neck tube formed inside said wall to lock said filler neck tube to said fuel tank, said stop flange and said lock flange providing the sole means for securing said filler neck tube within said opening;

a seal interposed in said opening between said wall and said filler neck tube, said seal being annular in shape and having an inner surface with an arcuate shape and an outer surface with a planar shape;

a washer disposed inside said fuel tank between said wall and said lock flange to engage said seal, said washer having an aperture extending axially therethrough to allow said filler neck tube to extend through said washer; and wherein said washer has a flange extending therefrom to engage said seal to provide a spring force to said seal.

23. A fuel tank assembly comprising:

a plastic fuel tank having a wall with an opening extending therethrough;

a tank filler neck tube extending through said opening in said fuel tank and having an annular stop flange projecting radially outward from said filler neck tube outside said wall and an annular lock flange projecting radially outward from said filler neck tube formed inside said wall to lock said filler neck to said fuel tank, said stop flange and said lock flange providing the sole means for securing said filler neck tube within said opening;

a seal interposed in said opening radially between said wall and said filler neck tube, said seal being annular in shape and has an inner surface with an arcuate shape and an outer surface with a planar shape; and a washer disposed inside said fuel tank axially between said wall and said lock flange to engage said seal, said washer having an aperture extending axially therethrough to allow said filler neck tube to extend through said washer.

* * * * *